United States Patent [19]
Gage

[11] Patent Number: 5,711,393
[45] Date of Patent: Jan. 27, 1998

[54] DRIVE AXLE ASSEMBLY WITH SCREW CAP

[75] Inventor: Garrett W. Gage, Goodrich, Mich.

[73] Assignee: American Axle & Manufacturing Inc., Detroit, Mich.

[21] Appl. No.: 504,589

[22] Filed: Jul. 20, 1995

[51] Int. Cl.⁶ .................................................. B60B 35/00
[52] U.S. Cl. ................... 180/385; 180/379; 384/489; 384/583; 301/124.1; 301/126
[58] Field of Search ....................... 180/377, 379, 180/380, 381, 385, 371; 74/607; 384/489, 583; 301/124.1, 126, 137

[56] References Cited

U.S. PATENT DOCUMENTS

| | | | |
|---|---|---|---|
| 1,104,174 | 7/1914 | Duffy | 301/126 |
| 1,400,170 | 12/1921 | Kraft | 180/379 |
| 1,405,642 | 2/1922 | Vanderbeek | 301/126 |
| 1,973,837 | 9/1934 | Youngren | 180/379 |
| 2,362,978 | 11/1944 | Alden | 180/379 |
| 2,986,435 | 5/1961 | Rundt | 180/379 |
| 3,283,843 | 11/1966 | Runyan | 180/379 |
| 3,425,760 | 2/1969 | Gordon | 384/583 |
| 3,635,303 | 1/1972 | Hetmann et al. | 180/370 |
| 3,690,399 | 9/1972 | Bokovoy et al. | 180/379 |
| 4,037,694 | 7/1977 | Keese | 180/370 |
| 4,142,615 | 3/1979 | Sidles, Jr. et al. | 180/370 |
| 4,331,210 | 5/1982 | Petrak | 301/126 |
| 4,437,536 | 3/1984 | Colanzi et al. | 180/379 |
| 5,380,103 | 1/1995 | Lederman | 384/489 |

Primary Examiner—Brian L. Johnson
Assistant Examiner—Gary Savitt
Attorney, Agent, or Firm—Reising, Ethington, Barnard & Perry

[57] ABSTRACT

A drive axle assembly has a gear housing, axle tubes extending outwardly of the gear housing, and an axle shaft disposed in each axle tube with an external wheel hub at a protruding end of the axle shaft. Each axle shaft is rotatably supported in a flanged end collar at a remote end of the axle tube by a bearing assembly that is mounted on the axle shaft and retained in the end collar by a screw cap. The drive axle assembly includes a brake member mounted externally on the end collar in juxtaposition to an external shaped flange of the end collar. The screw cap clamps the brake member against the external flange to locate the brake member on the axle tube in an axial direction and to nonrotatably couple the brake member to the axle tube.

17 Claims, 2 Drawing Sheets

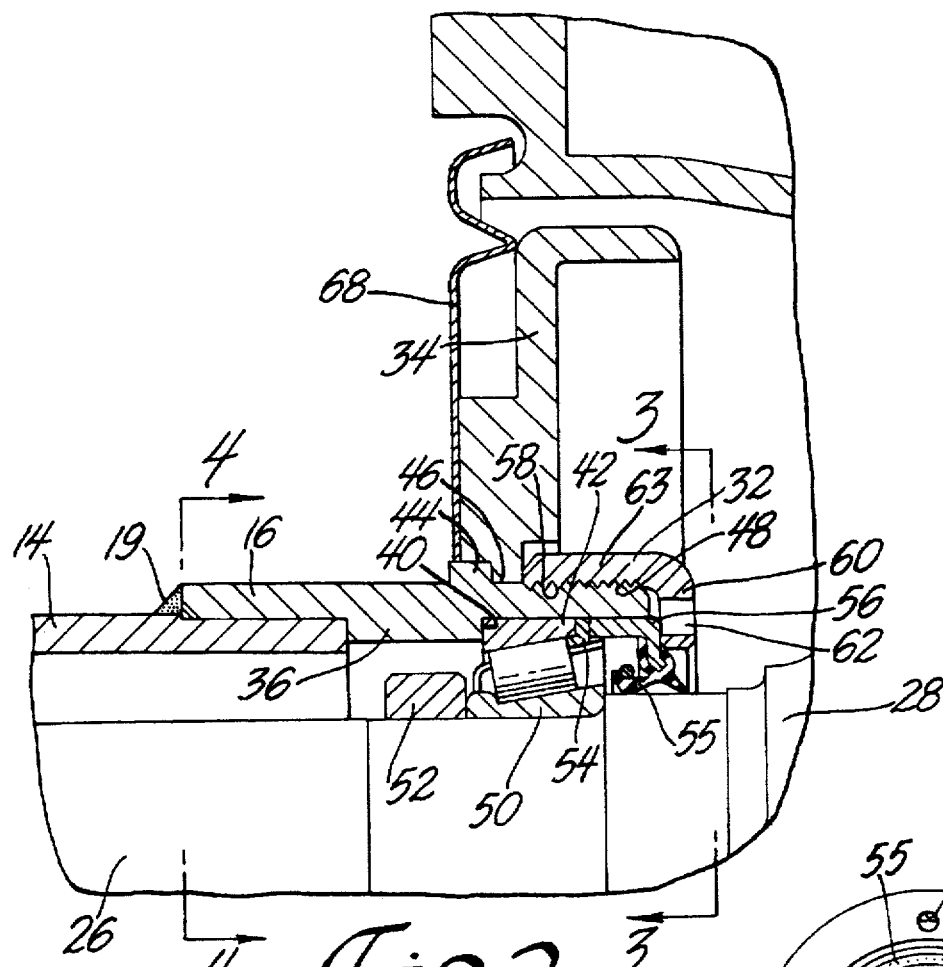
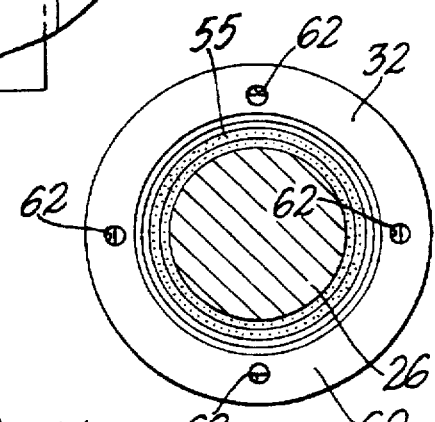
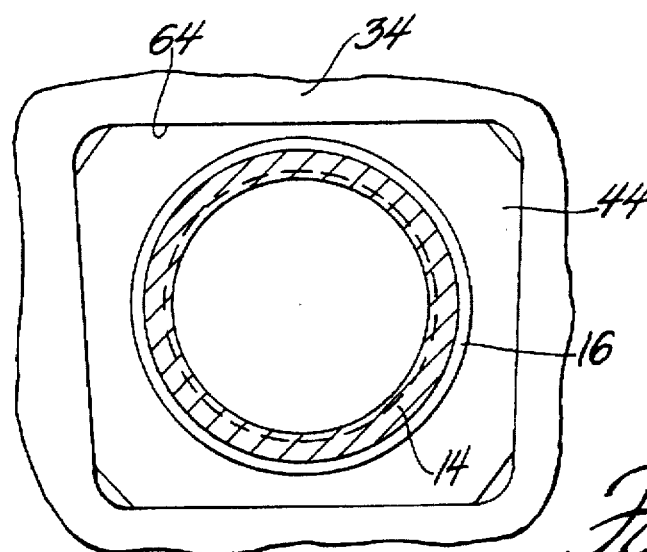

DRIVE AXLE ASSEMBLY WITH SCREW CAP

BACKGROUND OF THE INVENTION

This invention relates generally to a drive axle assembly and more particularly to a drive axle assembly that includes an interior bearing assembly and an exterior stationary brake member at each end.

U.S. Pat. No. 1,104,174 granted to Thomas L Duffy Jul. 21, 1914 discloses a rear axle for motor vehicles comprising an axle shaft that carries a double row ball bearing assembly. The ball bearing assembly has an inner bearing member that is retained between an integral shoulder of the axle shaft and an annular nut that is screw threaded to the axle shaft so that the ball bearing assembly is inserted into and removed from the axle housing with axle shaft. The ball bearing assembly has outer ball bearing members that are held together by a band and confined between an integral shoulder of an axle end shell and a ring that is screwed onto the end of the shell and locked in placed by a pointed locking plate. The rear axle does not have any provision for attaching an external stationery brake member to the axle housing. Thus the sole function of the ring is to retain the outer bearing members in the axle end shell and consequently the axle shaft in the axle housing.

U.S. Pat. No. 3,283,843 granted to Doward L. Runyan Nov. 8, 1966 discloses an axle construction comprising a left hand and a right hand axle shaft as viewed in FIG. 1 of the patent drawing. Each axle shaft carries a tapered bearing sub-assembly that includes an inner race that is press fitted on the respective axle shaft and further restrained from axial movement by a collar press fitted on the respective axle shaft. The separate outer race of the tapered bearing for the left hand axle shaft is retained by retainer ring that is mounted to the outer end of the housing by a circular series of bolts passing through an axle housing flange and a flange portion of the retainer ring. Nuts fix the retainer ring to the axle housing and also serve to clamp a brake backing plate between the flange of the retaining ring and the axle housing flange. The retainer ring for the separate outer race of the taper bearing assembly for the right hand axle shaft includes a threaded adjustor nut. The adjustor nut engages the outer face of the outer race of the right hand bearing assembly and takes up bearing play when the adjustor nut is screwed into the retainer ring for the right hand axle shaft. Thus the retainer ring per se and the retainer ring-adjustor nut combination both have the common dual function of retaining an outer race of the bearing in the end of the axle housing and clamping an external stationary brake member to the end of the axle housing. However, in each case, the retainer ring is attached by a circular series of bolts passing through an axle housing flange and a flange portion of the retainer ring. This attachment requires several bolts, nuts and holes in the retainer ring, the axle flange and the stationary brake member. Thus the attachment of the retainer ring is complicated and expensive due primarily to the need for several holes in several parts and several two piece fasteners that require one piece to be inserted through several holes and then assembled to the other piece.

SUMMARY OF THE INVENTION

The object of this invention is to provide a drive axle assembly having a dual function retainer ring that not only retains the outer race of the bearing in the end of the axle housing and clamps an external stationary brake member on the end of the axle housing but also attaches to the end of the axle housing easily and economically.

A feature of the invention is that the drive axle assembly includes a retainer ring in the form of a screw cap that clamps a stationary braking member in place without any need of holes, or nuts and bolts or similar two piece fasteners.

Another feature of the invention is that the drive axle assembly includes a retainer ring in the form of a screw cap that has a radial flange that retains a bearing assembly in the end of an axle housing to hold an axle shaft in place and an end that clamps and nonrotabable couples a brake member to the end of the axle housing when the screw cap is tightened down.

Still another feature of the invention is that the drive axle assembly includes a retainer ring in the form of a screw cap that clamps and nonrotatably couples a brake member to the end of the axle housing in a strong torque resistent manner so that the brake member may constitute a primary brake member such as a parking brake drum, a parking brake disk or a mounting plate for the caliper of a dynamic disk brake for the vehicle.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 2 is an enlargement of an end portion of the drive axle assembly shown in FIG. 1;

FIG. 3 is a section taken substantially along the line 3—3 of FIG. 2 looking in the direction of the arrows; and FIG. 4 is a section taken substantially along the line 4—4 of FIG. 2 looking in the direction of the arrows;

DESCRIPTION OF THE INVENTION

Figure 1:
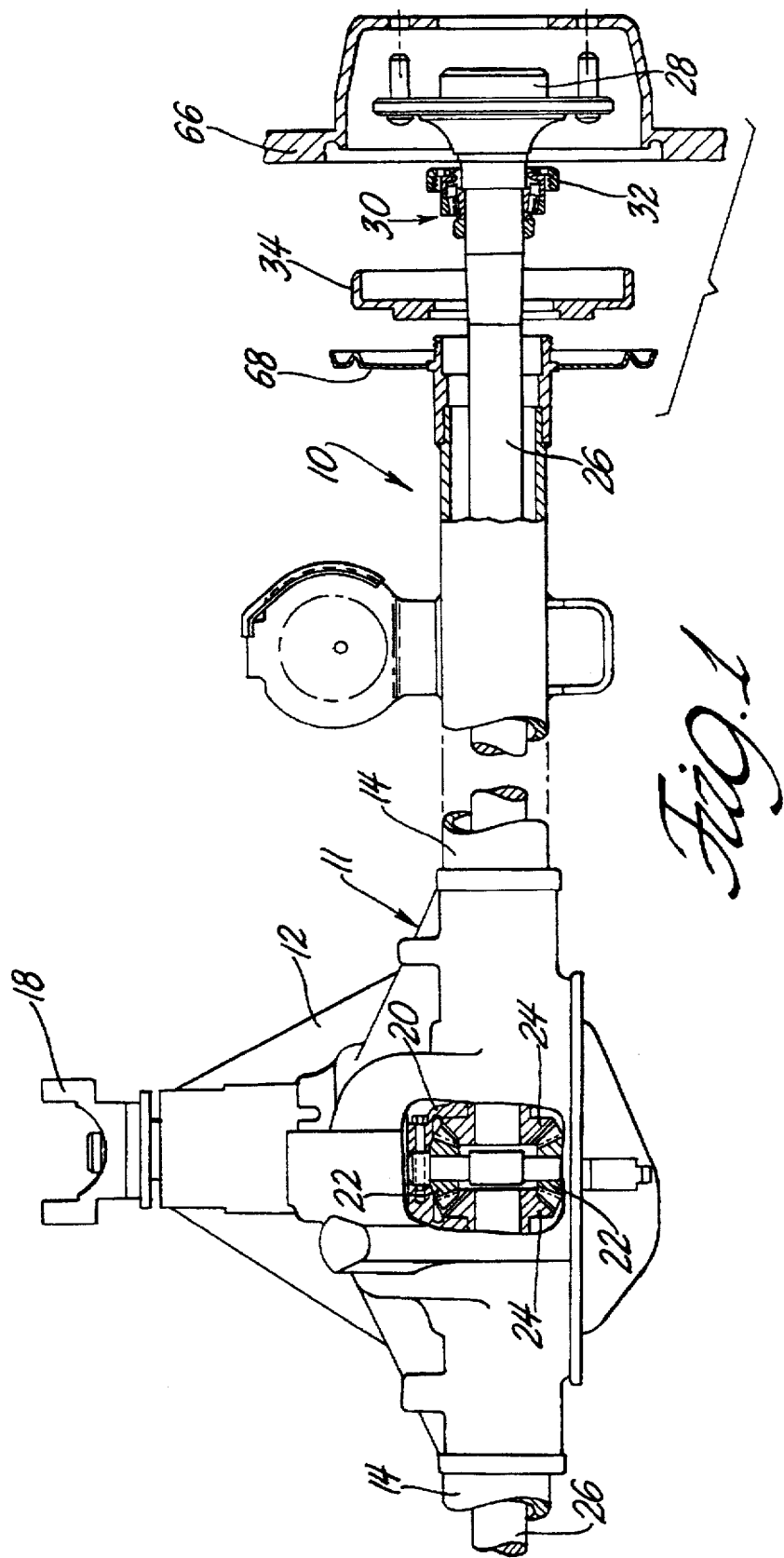
FIG. 1 is a partially sectioned and exploded plan view of a drive axle assembly in accordance with the invention.

Referring now to the drawing, particularly FIG. 1, there is illustrated a drive axle assembly 10 having an axle housing 11 comprising a gear housing 12 and two axle tubes 14 extending outwardly from opposite sides of the gear housing 12. Each axle tube 14 has an end collar 16 welded to the outboard end. Alternatively the end collars 16 may be integrally attached to the outboard ends of the respective axle tubes 14, for example by swaging the end of an appropriately shaped tube.

Disposed in the gear housing 12 is a conventional bevel gear differential that has a ring gear (not shown) that is driven by an external, longitudinal driveshaft or propeller shaft of an automotive vehicle (not shown) that is connected to an input yoke 18. The ring gear is connected to and drives a differential case 20 that carries two rotatable pinion gears 22 that mesh with two side gears 24 rotatably mounted inside the case 20. Each side gear 24 is connected to an inboard end of an axle shaft 26 that has an outboard hub 28 to which a vehicle wheel (not shown) is attached.

Each axle shaft 26 is rotatably supported at the end collar 16 by a bearing assembly 30, one of which is shown. The typical bearing assembly 30 is mounted on the axle shaft 26 and retained in the end collar 16 by a screw cap 32 that also retains a brake member 34, which in this particular instance is a stationary parking brake drum.

Referring now to FIGS. 2, 3 and 4, the flanged end collar 16 has an internal medial land 36 that forms annular inboard and outboard stop shoulders 38, 40. The inboard stop shoulder 38 engages the end of the axle tube 14 to locate the end collar 16 properly which is then welded to the axle tube 14 at 19. The outboard stop shoulder 40 engages one end of an outer race or cup 42 of the bearing assembly 30, which in this particular case is a tapered roller bearing assembly.

The end collar 16 has an external medial flange 44 that has a square outline as best shown in FIG. 4. The end collar 16 includes a circular land 46 next to the outboard side of the flange 44 that is a pilot surface for mounting the brake member 34. The outboard end of the flanged end collar 16 is then threaded at 48.

The tapered roller bearing assembly 30 includes an inner race or cone 50 that is mounted on the axle shaft 26 against a thrust shoulder that is formed on the axle shaft 26 near the hub 28. The inner race 50 is mounted on the axle shaft 26 with a press fit. A retaining ring 52 is mounted on the drive shaft 26 with a press fit, shrink fit or other interference fit to hold or assist in holding the inner race 50 against the thrust shoulder of the axle shaft 26.

The tapered roller bearing assembly 30 also includes a thrust ring 54 and a bearing seal 55 that has an outer metal cup 56. The thrust ring 54 has an annular lip that fits in the large diameter end of the bearing cup 42 for engagement by the ends of the tapered rollers so that the tapered roller bearing assembly 30 has thrust capacity in both directions when it is installed.

The outer diameters of the thrust ring 54 and the outer metal cup 56 of the seal 55 are substantially the same as the outer diameter of the bearing outer race 46 and each preferably has a sliding fit in the end of the flanged end collar 16 to facilitate installation.

The screw cap 32 has internal threads 58 that engage the external threads 48 of the end collar 16 and a redial flange 60. The radial flange 60 is provided with four orthogonally related holes 62 for turning the screw cap 32 by means of a spanner tool (not shown) that engages in either set of diametrically opposed holes 62.

When the screw cap 32 is assembled to the end collar 16 and tightened down, the radial flange 60 engages the outer metal cup 56 of the seal 55 and presses the bearing outer race 42 against the outboard stop shoulder 40 via the thrust ring 54.

When tightened down, the ring portion 63 of screw cap 32 also holds the brake member 34 against the flange 44 to hold the brake member 34 in the axial direction on the end collar 16 at the end of the axle tube 14. The brake member 34 has a square shaped recess 64 that receives a portion of the square shaped flange 44 of the end collar 16 so that the brake member 34 is also nonrotatably coupled to the end collar 16 by the screw cap 32 when it is tightened down. This provides a non-rotatable coupling that is strong and torque resistent so the brake member 34 may constitute a primary brake member such as the parking brake drum that is illustrated in FIG. 1 or a mounting plate for a caliper or brake shoes for a dynamic brake for the vehicle wheel that is attached to the hub 28.

While the flange 44 and the recess 64 are shown as generally square shaped, other non-circular shapes may be used to nonrotatably couple the two parts together. Moreover, the recess 64 can be replaced by one or more attached bars or integral protrusions of the brake member 34 that engage one or more sides of the flange 44 to prevent relative rotation between the two parts. It is also possible to provide the recess or its equivalent as part of the end collar 16 and the cooperating flange as part of the brake member 34.

The drive axle assembly 10 is assembled in the following manner. The inboard end of the axle shaft 26 is inserted into the screw cap 32 and then into the bearing assembly 30 including the thrust ring 54 and the bearing seal 55 until the inner race abuts the thrust shoulder of the axle shaft 26. Next the retaining ring 52 is mounted on the axle shaft 26 with a press fit, shrink fit or other interference fit to hold the inner race 50 in place on the axle shaft 26. In the meantime, the brake member 34 is piloted on the circular land 46 of the end collar 16.

The axle shaft 26 is then inserted into the axle tube 14 until the inboard end of the axle shaft 26 engages in the bore of its associated side gear 24 and the outer race 42 of the bearing assembly 30 is inside the end collar 16 against the outboard stop shoulder 40. The screw cap 32 is still loosely assembled to the axle shaft 26 after the bearing outer race 42, thrust ring 54 and seal 55 are inserted into the end collar 16. The screw cap 32 thus has a wide range of movement with respect to the axle shaft 26 so that the screw cap 32 is then screwed onto the threaded end 48 of the end collar 16 easily and tightened down.

When tightened down, the radial flange of the screw cap 32 presses against the outer metal cup 56 to hold the outer race 42 of the bearing assembly 30 in place and the end of the screw cap 32 presses against the brake member 34 to hold it in place on the end of the axle tube 14.

The disc brake rotor 66 is then assembled to the hub 28 in a conventional manner. A shield 68 for the back side of the disc brake rotor 66 may also be attached to the end collar 16 or the brake member 34 in any suitable manner.

Thus it can be seen that the screw cap 32 provides a dual function retainer ring that is easily and economically attached to the end of the axle shaft housing 11. Moreover, the dual function screw cap 32 not only retains the bearing outer race 42 in the end of the axle housing 11, it also clamps the brake member 34 on the end of the axle housing 11 in a strong, torque resistent manner so that the brake member 34 can function as a primary brake member such as the parking brake drum that is illustrated in the patent drawing.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A drive axle assembly having a gear housing, axle tubes extending outwardly of the gear housing, and an axle shaft disposed in each axle tube comprising:

each axle shaft being rotatably supported at a remote end of the axle tube by a bearing assembly that is mounted on the axle shaft and retained in the end of the axle tube by a screw cap that is threadably connected to the remote end of the axle tube, the axle tube having an external flange adjacent the remote end, the drive axle assembly further including an external brake member mounted on the remote end of the axle tube in juxtaposition to the external flange, and the screw cap clamping the brake member against the external flange to locate the brake member on the axle tube in an axial direction and to nonrotatably couple the brake member to the axle tube.

2. The drive axle assembly as defined in claim 1 wherein the flange has a noncircular portion that fits into a noncircular recess of the brake member or vice versa to nonrotatably the brake member to the axle tube.

3. The drive axle assembly as defined in claim 2 wherein the flange has a noncircular shape.

4. The drive axle assembly as defined in claim 2 wherein the flange has a generally square shape that fits in a generally square recess of the brake member.

5. The drive axle assembly as defined in claim 1 wherein the brake member is a primary brake member such as a parking brake drum.

6. The drive axle assembly as defined in claim 1 wherein the screw cap is loosely assembled to the axle shaft to facilitate attachment to the remote end of the axle tube.

7. A drive axle assembly having a gear housing, axle tubes extending outwardly of the gear housing, and an axle shaft disposed in each axle tube comprising:

each axle shaft being rotatably supported at a remote end of the axle tube by a bearing assembly that includes an inner race that is mounted on the axle shaft and an outer race that is retained in the end of the axle tube by a radial flange of a screw cap that is threadably connected to the remote end of the axle tube, the axle tube having an external flange adjacent the remote end, the drive axle assembly further including an external brake member mounted on the remote end of the axle tube in juxtaposition to the external flange, and the screw cap having a ring portion clamping the brake member against the external flange to locate the brake member on the axle tube in an axial direction and to nonrotatably couple the brake member to the axle tube.

8. The drive assembly as defined in claim 7 wherein each axle tube has a flanged end collar that is attached to the remote end.

9. The drive assembly as defined in claim 8 wherein the end collar has an internal medial land that forms annular inboard and outboard stop shoulders for engaging the end of the axle tube to locate the end collar on the axle tube in the axial direction and for engaging the outer race of the bearing assembly respectively.

10. The drive assembly as defined in claim 7 wherein the bearing assembly has a thrust capacity in both directions.

11. The drive assembly as defined in claim 7 wherein the bearing assembly is a tapered roller bearing assembly that has a thrust capacity in both directions.

12. The drive axle assembly as defined in claim 11 wherein the tapered roller bearing assembly includes the inner race that is mounted on the axle shaft and the inner race is held against a thrust shoulder that is formed on the axle shaft by a retaining ring that is mounted on the drive shaft with an interference fit.

13. A drive axle assembly having a gear housing, axle tubes extending outwardly of the gear housing, and an axle shaft disposed in each axle tube comprising:

each axle shaft being rotatably supported at a remote end of the axle tube by a bearing assembly that includes an inner race that is mounted on the axle shaft and an outer race that is retained in the end of the axle tube by a radial flange of a screw cap that is threadably connected to the remote end of the axle tube, the axle tube having an end collar that is attached to the remote end, the end collar having an external medial flange that is square shaped and a circular land next to the outboard side of the flange piloting an external brake member, and an outboard end that is threaded for connection to the screw cap, and the screw cap having a ring portion clamping the brake member against the external flange to locate the brake member on the axle tube in an axial direction and to nonrotatably couple the brake member to the axle tube.

14. The drive axle assembly as defined in claim 13 wherein the screw cap has internal threads that engage the external threads of the flanged end collar.

15. The drive axle assembly as defined in claim 13 wherein the radial flange of the screw cap is provided with four orthogonally related holes for turning the screw cap by means of a spanner tool that engages in either set of diametrically opposed holes.

16. A drive axle assembly having a gear housing, axle tubes extending outwardly of the gear housing, and an axle shaft disposed in each axle tube comprising:

each axle shaft being rotatably supported at a remote end of the axle tube by a bearing assembly that includes an inner race that is mounted on the axle shaft and an outer race that is retained in the end of the axle tube by a radial flange of a screw cap that is threadably connected to the remote end of the axle tube, the axle tube having an external flange adjacent the remote end, the drive axle assembly further including an external brake member mounted on the remote end of the axle tube in juxtaposition to the external flange, the screw cap having a ring portion clamping the brake member against the external flange to locate the brake member on the axle tube in an axial direction and to nonrotatably couple the brake member to the axle tube, the bearing assembly being a tapered roller bearing assembly that has a thrust capacity in both directions, the tapered roller bearing assembly including an inner race that is mounted on the axle shaft against a thrust shoulder that is formed on the axle shaft near a hub and held against the thrust shoulder by a retaining ring that is mounted on the drive shaft with an interference fit, and the tapered roller bearing assembly further including a thrust ring and a bearing seal that has a metal mounting cup, the thrust ring having an annular lip that fits in the large diameter end of the bearing cup for engagement by the ends of the tapered rollers so that the tapered roller bearing assembly has thrust capacity in both directions.

17. The drive axle assembly as defined in claim 16 wherein the outer diameters of the thrust ring and the metal mounting cup are substantially the same as the outer diameter of the bearing outer race and each has a sliding fit in the end of the flanged end collar.

* * * * *